United States Patent
Graber et al.

(10) Patent No.: US 11,093,043 B1
(45) Date of Patent: Aug. 17, 2021

(54) DETECTING HAND GESTURES USING RING-SHAPED ELECTRONIC DEVICES

(71) Applicant: Amazon Technologies, Inc., Seattle, WA (US)

(72) Inventors: Sarah Graber, Seattle, WA (US); Joshua Watson, Seattle, WA (US); Michael Van Gorkom, Redmond, WA (US); Ravikant Cherukuri, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/402,491

(22) Filed: May 3, 2019

(51) Int. Cl.
*G09G 5/00* (2006.01)
*G06F 3/01* (2006.01)
*G06F 1/16* (2006.01)

(52) U.S. Cl.
CPC .............. *G06F 3/017* (2013.01); *G06F 1/163* (2013.01); *G06F 3/014* (2013.01)

(58) Field of Classification Search
CPC ..... G06F 3/017; G06F 3/04883; G06F 3/0488
See application file for complete search history.

(56) References Cited

U.S. PATENT DOCUMENTS

| | | | | |
|---|---|---|---|---|
| 2007/0268268 A1* | 11/2007 | Allison | ............... | G06F 3/03547 345/173 |
| 2015/0002387 A1* | 1/2015 | Cai | ......................... | G06F 3/014 345/156 |
| 2015/0205379 A1* | 7/2015 | Mag | ...................... | G06F 1/1626 345/156 |
| 2015/0379238 A1* | 12/2015 | Connor | ............... | G06F 19/3475 702/19 |

* cited by examiner

*Primary Examiner* — Nan-Ying Yang
(74) *Attorney, Agent, or Firm* — Eversheds Sutherland (US) LLP

(57) ABSTRACT

Systems, methods, and computer-readable media are disclosed for systems and methods for detecting hand gestures using ring-shaped electronic devices. Example methods may include determining, by a ring-shaped electronic device comprising a motion sensor, first motion sensor data using the motion sensor, determining a first hand motion associated with the first motion sensor data, determining a first action associated with the first hand motion, and causing the first action to be implemented at a user device that is in wireless communication with the ring-shaped electronic device.

17 Claims, 6 Drawing Sheets

DETECTING HAND GESTURES USING RING-SHAPED ELECTRONIC DEVICES

BACKGROUND

Electronic devices, such as smartphones, tablets, and the like, may be used for various purposes, such as making calls, accessing information, sending messages, consuming content, and so forth. In some instances, users may use electronic devices for certain purposes by interacting with the devices. For example, a user may take the user's phone out of their pocket in order to send a message. However, users may not desire to physically interact with certain electronic devices each time the user desires to perform a certain action.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
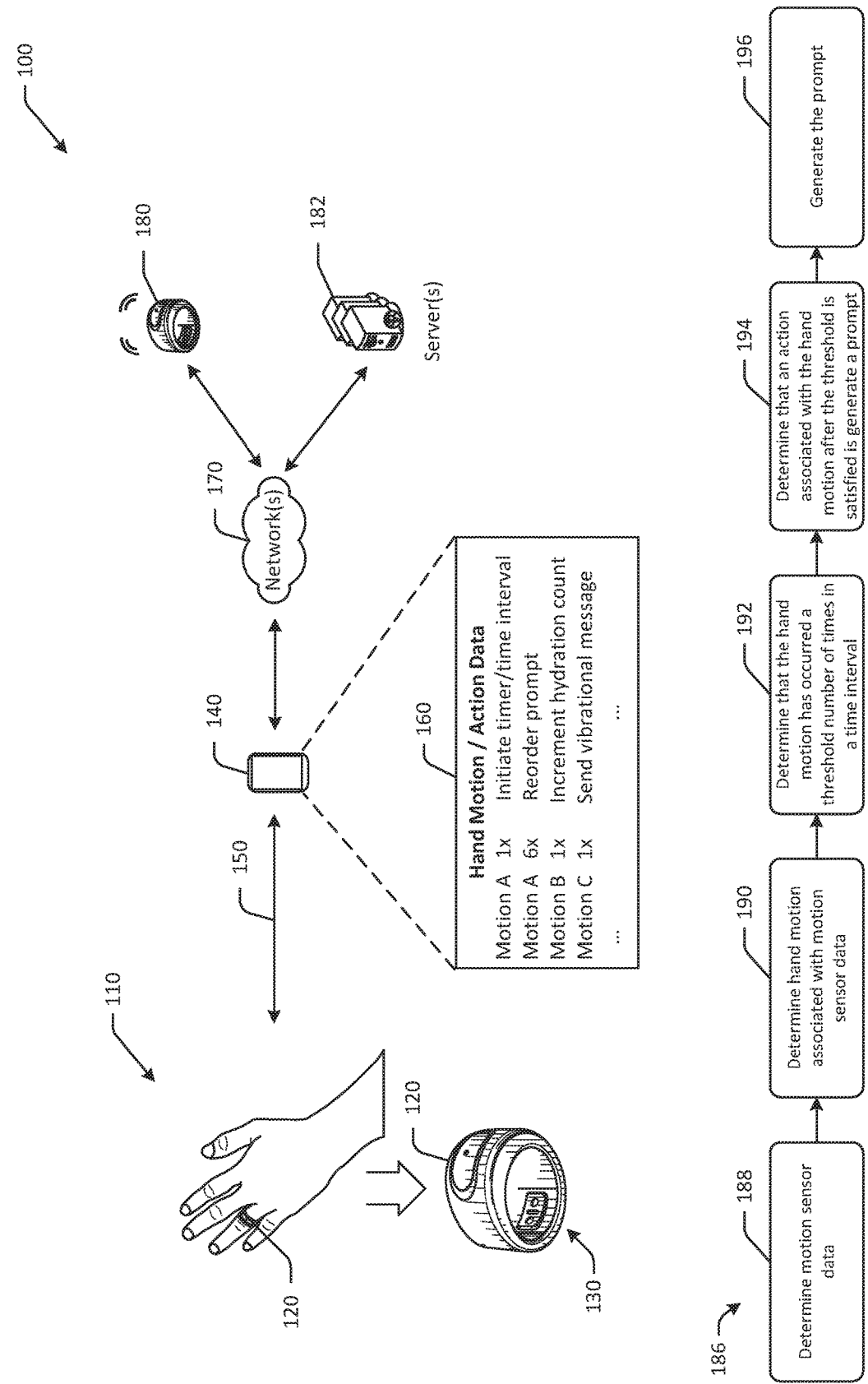
FIG. 1 is a schematic illustration of an example use case for detecting hand gestures using ring-shaped electronic devices and presentation in accordance with one or more example embodiments of the disclosure.

Wearable devices may include electronic devices that a user can wear, for example, as an accessory, or can otherwise take with them, such as in the user's pocket. Wearable devices may include watches, bracelets, glasses, electronic trackers, and so forth. Because wearable devices may be worn by users, factors of the device including size, weight, shape, and the like may affect a user experience with the device. For example, a device that is bulky, heavy, or too large may be impractical for certain users to use or wear. In addition, reducing a size or footprint of a device may affect the functionality of the device. For example, reducing the size of a battery in the device may reduce an amount of time the device can operate without being recharged. Accordingly, a size, shape, weight, and/or other factors may impact not only a user experience with a wearable device, but functionality of the device as well.

Wearable devices may be used, in some instances, to communicate wirelessly with other devices. For example, a smartwatch may wirelessly communicate with a smartphone using a Bluetooth or other wireless connection. Users may use wearable devices to receive notifications of communications, send messages, and/or for other purposes. Certain wearable devices may be displayless, or may not include displays at which information, such as text, images, videos, or other information, can be presented. Displayless devices may not, in some embodiments, include any visual indicators, such as light emitting diodes, while in other embodiments, displayless devices may include light emitting diodes. To interact with displayless devices, users may use buttons, voice, and/or other forms of input, as touch inputs may be unavailable at displayless devices.

In addition, to perform certain tasks, such as adjusting a temperature of a thermostat, selecting a certain telephone number to call, and other tasks, a user may use a user device, such as a smartphone, instead of a wearable device. As a result, the user may have to physically interact with the user device. However, in some instances, the user device may be in the user's pocket, in the user's bag, or in a different location. To access the device, the user may therefore have to retrieve the device itself.

Embodiments of the disclosure may include ring-shaped electronic devices that can be worn by users on a finger, and that are configured to detect voice input and to wirelessly communicate with other electronic devices. Certain embodiments may be configured to detect various user inputs, such as hand motions or gesture-based inputs, and may be configured to automatically implement one or more actions. As a result, users may not have to physically interact with a user device, such as a smartphone. For example, in some instances, a user may be unable or unwilling to take a smartphone out of the user's pocket or bag. However, the user may wish to set a timer, make a phone call, send a message, unlock a door with an electronic or smart lock, or perform another task. Using the ring-shaped electronic devices described herein, the user may perform a hand motion or a certain gesture while wearing the ring-shaped electronic device, and the ring-shaped electronic device may (optionally in combination with the user's smartphone) determine one or more actions associated with the hand motion. For example, the ring-shaped electronic device may detect the performance of a hand motion or gesture, and may send one or more signals indicative of the detected hand motion to a connected user device, and may cause the user device to implement one or more actions, such as initiating a phone call, placing an order, initiating a service, controlling a third device, and so forth. The user may therefore not have to physically interact with the user device, and can instead perform certain actions using the ring-shaped electronic devices described herein. Other examples of functionality include using the ring-shaped electronic devices to control other electronic devices, such as televisions, stereos, content streaming devices, and so forth, sending voice messages, receiving information (e.g., audible presentation of a current time, etc.), and other functionality.

Because the user may wear the ring-shaped electronic device on a finger, motion data, such as accelerometer data captured using an accelerometer and/or motion sensor of the device, that is unique to movements of the user's hand and/or finger may be captured and used to detect certain hand and/or finger movements. Such motion sensor data may provide insights into user motions that may otherwise be unavailable. For example, a watch worn by a user may be used to determine motions performed by a user's arm, whereas ring-shaped electronic devices, such as those described herein, may be used to determine motions performed by a user's hand and/or finger. Accordingly, specific response actions may be associated with specific hand motions (as used herein, hand motions may refer to hand and/or finger motions). In some embodiments, ring-shaped electronic devices may be displayless, or devoid of a display.

Embodiments of the disclosure include systems and methods of detecting hand gestures (e.g., hand and/or finger motions, etc.) using ring-shaped electronic devices. For example, certain embodiments may determine motion sensor data using a motion sensor of the device. The motion sensor data may correspond to a certain activity that the user performed, such as twisting open a bottle, opening a bottle cap, and so forth. Based at least in part on the motion sensor data and/or the associated user activity, the ring-shaped electronic device and/or a connected user device may automatically implement one or more actions, such as logging a hydration event, initiating a vibrational message (e.g., a message sent to another user that causes the recipient's ring-shaped electronic device to vibrate in a particular manner and does not include a text component in some instances, etc.), generating prompts, and other actions. In another example, custom hand motions may be associated with certain actions. For example, the motion sensor data corresponding to a custom hand motion may be associated with a user-specific action of unlocking a door lock (e.g., the user may select an action for association with the specific motion sensor data, etc.). As a result, the user may cause one or more actions to be automatically initiated using a ring-shaped electronic device, and may therefore not have to interact with a user device such as a smartphone.

Certain hand motions may be associated with more than one action, and additional signals, such as frequency, current time, time of day, current location, iterations, force, and the like may be used to select the most contextually relevant action when the hand motion is detected. For example, if a bottle cap opening hand motion is detected six times within a certain time interval, such as one minute, the ring-shaped device and/or a connected device, such as a smartphone, may determine that the user is opening bottles for friends. Based at least in part on a current location, it may be determined that the user is at home, for example. Since beverages may come in six packs, a response action of generating a prompt to reorder a previously ordered beverage may be performed. If the user used a camera or took pictures during the timeframe around which the bottles were opened by the user, a response action of prompting the user to share the photos with other users or to social media may be performed.

This disclosure relates to, among other things, devices, systems, methods, computer-readable media, techniques, and methodologies for detecting hand gestures using ring-shaped electronic devices. Certain embodiments may automatically cause a user device, such as a smartphone, to initiate one or more actions, such as send voice data or text data to a remote server, send a message, initiate a voice call, and/or other actions. Some embodiments may include customizable actions associated with various hand motions performed while wearing a ring-shaped electronic device. For example, a first hand motion performed with a ring-shaped electronic device may initiate a phone call to a certain user, while a second hand motion performed with a ring-shaped electronic device may cause a smartphone to send stored audio (or a stored speech-to-text transcription of the audio) representing a command to "adjust a thermostat to 74 degrees" to a remote server for subsequent implementation at the thermostat. A user of the ring-shaped electronic device may therefore not only avoid interaction with a user device, such as a smartphone, but may also avoid interacting with the ring-shaped electronic device using voice as well in some embodiments.

Referring to FIG. 1, an example use case 100 for detecting hand gestures using ring-shaped electronic devices is depicted in accordance with one or more example embodiments of the disclosure. In the illustrated example, a user may use a ring-shaped electronic device 120 to communicate with another electronic device, such as a smartphone 140. In other examples, the ring-shaped electronic device 120 may be used to communicate with other electronic devices, such as streaming devices, television devices, home automation devices (e.g., thermostat devices, appliances, etc.), and/or other devices. The ring-shaped electronic device 120 may include one or more motion sensors and/or accelerometers, and may optionally include one or more buttons 130. The button 130 may be on a lower portion of the ring-shaped electronic device 120, such that a user can push the button 130 with a thumb or other finger of the hand on which the user is wearing the ring-shaped electronic device 120.

The ring-shaped electronic device 120 may be wirelessly connected to the smartphone 140 over a wireless connection 150, such as a Bluetooth connection, a WiFi connection, or another suitable wireless connection. To interact with the ring-shaped electronic device 120, the user that is wearing the ring-shaped electronic device 120 may, in some instances, perform a motion or gesture with the hand or finger on which the ring-shaped electronic device 120 is worn. In other instances, the user may interact with the button 130 or other component of the ring-shaped electronic device 120. Different user interactions with the ring-shaped electronic device 120 may result in different functions being triggered at the ring-shaped electronic device 120. For example, certain hand motion interactions, such as a knocking hand motion, may cause the ring-shaped electronic device 120 to send a signal to unlock a door if the user is nearby a door with an electronic lock. In another example, certain button interactions, such as a certain number of taps or presses, a combination of taps and/or presses, and/or other button interactions may trigger various functions, such as initiating phone calls, sending signals to other devices (e.g., to a television or content streaming device, etc.), and/or other functions. In some instances, user interactions at the ring-shaped electronic device 120 may cause the ring-shaped electronic device 120 to send one or more signals or data to the smartphone 140, which may initiate and/or implement one or more actions responsive to the signals or data. In some embodiments, the user may interact with the ring-shaped electronic device 120 using voice, such as by speaking a wake word (e.g., "Alexa," etc.). The ring-shaped electronic device 120 may listen for a request or voice command, and may respond accordingly. For example, the ring-shaped electronic device 120 may cause one or more operations to be performed, such as controlling other devices (e.g., televisions, lights, radios, thermostats, etc.), may respond with audible information (e.g., weather, news, messages, etc.), and/or may perform different actions in response to a request or command.

The ring-shaped electronic device 120 may include one or more motion sensors that may be used to determine acceleration and related motion data. The determined motion data may be used to determine an action or hand motion being performed by a user wearing the ring-shaped electronic device 120. The ring-shaped electronic device 120 may optionally include one or more microphones that may be used to detect voice input and/or generate a signal representing audio input. For example, in FIG. 1, the ring-shaped electronic device 120 may include a first microphone positioned at or near a bottom of the ring-shaped electronic device 120, where the bottom of the ring-shaped electronic device 120 may face the user's palm when the user makes a first ("bottom," "top," "upper," "lower," and "side" as used herein describe relative positioning for illustrative examples and not absolute positioning). Accordingly, to speak into the first microphone, the user may raise the user's hand towards the user's mouth and may speak into or near the first microphone.

Users may use the ring-shaped electronic device 120 for one or more purposes. For example, users may use the ring-shaped electronic device 120 to interact with a voice assistant (e.g., via speaking voice inputs to the ring-shaped electronic device 120, etc.), to interact with other users (e.g., via phone calls or other voice-based and/or text-based communications, etc.), to perform certain actions (e.g., automated actions such as controlling other devices, etc.), and/or for other purposes.

In some embodiments, certain hand motions may be associated with actions that may be automatically implemented by the ring-shaped electronic device 120 and/or the smartphone 120. Certain actions may be user-selected or customized actions, whereas other actions may be default or predetermined actions. For custom actions, using a companion mobile application at the smartphone 140, the user may select and/or designate certain actions to be associated with certain hand motions. The resulting associations, as well as the predetermined or default action associations, may be stored at the smartphone 140 as hand motion/action data 160. In the example of FIG. 1, a first hand motion (illustrated as motion "A" in FIG. 1) may be associated with different actions dependent on a threshold number of times the motion is detected. For example, the first hand motion may be associated with initiating a time interval or timer if the first hand motion occurs once during a time interval (e.g., 15 minutes, 1 hour, etc.), and may be associated with an action of a reorder prompt if the action occurs six times during the time interval. For example, if the first hand motion is a motion of opening a bottle cap, and the motion occurs six times within a time interval, the user may have opened six bottles of a beverage, and a reorder prompt for a previously ordered beverage may be generated and/or presented to the user, as the beverage may be sold in packs of six. In another example, a second hand motion (illustrated as motion "B" in FIG. 1) may be associated with a frequency of occurrence or threshold number of times of once occurrence, and may be associated with an action of incrementing a hydration count. For example, the second hand motion may be twisting open a bottle cap, and may indicate the user is opening a water bottle. Based at least in part on the hand motion, and optionally other signals, such as time, location, and so forth, it may be determined that the user is drinking water, and a health record or other application may be updated to indicate that the user has hydrated, such as by logging a hydration event. In another example, a third hand motion (illustrated as motion "C" in FIG. 1) may be associated with a frequency of occurrence or threshold number of times of once occurrence, and may be associated with an action of sending a vibrational message. For example, the third hand motion may be a custom hand motion, and may cause a vibrational message to be sent to another preset user, such as a friend. The vibrational message may be received by the recipient via a ring-shaped electronic device, and may optionally have a unique vibrational pattern, so that the recipient may realize the vibration is a vibrational message, as opposed to a different notification. In some embodiments, actions may be initiated by the ring-shaped electronic device 120 by sending a command signal to the smartphone 140, while in other embodiments, the smartphone 140 may initiate actions. Although illustrated in FIG. 1 as various hand motions and actions, other hand motions and actions may be used.

In the example of FIG. 1, if the first hand motion is detected six times within a time interval by one or more processors coupled to memory at the ring-shaped electronic device 120 (or at the smartphone 140), the ring-shaped electronic device 120 may send an indication of the detected hand motion to the smartphone 140 using the wireless connection 150. The smartphone 140 may determine, using the hand motion/action data 160, that a reorder prompt is to be presented. As a result, the smartphone 140 may generate a notification that may be audibly or visually presented at the smartphone 140, and/or audibly at the ring-shaped electronic device 120, indicative of a request to reorder a beverage. If an affirmative response is received at the ring-shaped electronic device 120 or the smartphone 140, the smartphone 140 may send an indication of the order to one or more servers 182 via one or more networks 170 to initiate delivery of the beverage reorder.

In another example, if the third hand motion is detected by the ring-shaped electronic device 120 or the smartphone 140 (using motion sensor data from the ring-shaped electronic device 120), the smartphone 140 may send a vibrational message to a second ring-shaped electronic device 180 via the network(s) 170. To send the vibrational message, the smartphone 140 may determine, using user settings data, contact information for a user to whom vibrational messages are to be sent (e.g., in some instances, there may be only one recipient of vibrational messages, while in other instances there may be more than one recipient, etc.). Contact information may include phone numbers, email addresses, device identifiers, user account identifiers, and/or other contact information. Based at least in part on the contact information associated with the user identifier, the smartphone 140 may send the vibrational message to the recipient using the contact information.

To initiate automated actions responsive to detected hand gestures using ring-shaped electronic devices, an example process flow 186 is presented and may be performed, for example, by one or more modules at the ring-shaped electronic device 120 and/or the smartphone 140. The ring-shaped electronic device 120 and/or other user device may include at least one memory that stores computer-executable instructions and at least one processor configured to access the at least one memory and execute the computer-executable instructions to perform various actions or operations, such as one or more of the operations in the process flow 186 of FIG. 1.

At a first block 188, the ring-shaped electronic device 120 may determine motion sensor data. For example, the ring-shaped electronic device 120 may determine motion sensor data using a motion sensor at the ring-shaped electronic device 120. The motion sensor data may be representative of a hand motion performed by a user wearing the ring-shaped electronic device 120. The motion sensor data may be continuously, intermittently, or periodically monitored to determine any correlations to hand motions and/or associated actions. In some embodiments, the ring-shaped electronic device 120 may determine first accelerometer data using an accelerometer or other motion sensor, and may send the first accelerometer data to a user device that is in wireless communication with the ring-shaped electronic device 120, such as the smartphone 140. In other instances, the ring-shaped electronic device 120 may process motion sensor data locally.

At a second block 190, the ring-shaped electronic device 120 may determine a hand motion associated with the motion sensor data. For example, the ring-shaped electronic device 120 may determine whether the motion sensor data corresponds to a known or predetermined hand motion, such as those in the hand motion/action data 160. In some embodiments, the ring-shaped electronic device 120 may process the motion sensor data locally to detect a corresponding hand motion or event, while in other embodiments, the ring-shaped electronic device 120 may send the motion sensor data to the smartphone 140 for processing. In some embodiments, the ring-shaped electronic device 120 may send an identifier or other indication of the detected hand motion to the smartphone 140 via the wireless connection 150. To locally detect events, the ring-shaped electronic device 120 may process the motion sensor data using firmware executing on one or more processors at the ring-shaped electronic device 120.

At a third block 192, the ring-shaped electronic device 120 (or the smartphone 140 or other user device in some embodiments) may determine that the hand motion has occurred a threshold number of times in a time interval. For example, the user may perform the first hand motion once, which may initiate a timer and/or start a time interval. The first hand motion may be opening a bottle cap, for example. The user may continue to open bottle caps such that the first hand motion is performed a threshold number of times in a time interval, such as six times in one minute. The threshold may therefore be satisfied. To determine that the threshold is satisfied, the ring-shaped electronic device 120 and/or the smartphone 140 may determine, using a hand motion library such as the hand motion/action data 160, that threshold associated with the hand motion is six, and that the hand motion has been detected six times (e.g., a number of bottles opened by the user within a time interval is greater than or equal to a first predetermined number or threshold, etc.).

At a fourth block 194, the ring-shaped electronic device 120 (or the smartphone 140 or other user device in some embodiments) may determine that an action associated with the hand motion after the threshold is satisfied is to generate a prompt, such as a reorder prompt. For example, the smartphone 140 may determine that the ring-shaped electronic device 120 has detected six hand motions within a time interval, and may determine an associated action (e.g., using the hand motion/action data 160, etc.). The smartphone 140 may determine that the action associated with the hand motion being performed the number of times in the time interval is a reorder prompt.

At a fifth block 196, the ring-shaped electronic device 120 and/or the smartphone 140 may generate the prompt. For example, the smartphone 140 may generate a visual prompt or audible notification prompting the user to reorder a previously ordered six pack beverage, and/or the ring-shaped electronic device 120 may generate an audible notification. The user of the ring-shaped electronic device 120 may then communicate with voice input using a microphone of the ring-shaped electronic device 120 to respond. For example, the ring-shaped electronic device 120 may audibly present "would you like to reorder this beverage?" and the user may audibly respond "yes" or "no." The ring-shaped electronic device 120 may present the prompt using a speaker of the ring-shaped electronic device 120. In another example, the user may interact with the smartphone 140 to respond to the prompt. If an affirmative response is received, the smartphone 140 may initiate the beverage reorder, or the ring-shaped electronic device 120 may cause the smartphone 140 or another user device to initiate the beverage reorder.

In some embodiments, because the contents of the bottle may be unknown, additional signals such as time, current location, and so forth may be determined and used to determine corresponding actions. For example, if hand motions of opening a bottle are determined to meet or exceed a certain threshold or predetermined number, an action associated with the hand motion may be to generate a rideshare request prompt. If an affirmative response is received, the smartphone 140 or other user device may be caused to initiate the rideshare request using the current location of the user.

As a result, users can not only interact with wirelessly connected user devices, such as smartphones, using the ring-shaped electronic device 120, but can also actively or passively initiate certain actions using hand motions with the ring-shaped electronic device 120.

Example embodiments of the disclosure provide a number of technical features or technical effects. For example, in accordance with example embodiments of the disclosure, certain embodiments of the disclosure may automatically detect hand motions, automatically control remote devices, and/or automatically initiate other actions based at least in part on user interactions with ring-shaped electronic devices. As a result of improved functionality, a number of actions needed by a user to complete certain tasks may be reduced, thereby decreasing friction of the user experience with not only the ring-shaped electronic device, but connected devices as well. Embodiments of the disclosure may improve computing efficiency and bandwidth by reducing a number of actions and calculations that need to be performed to initiate certain tasks. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
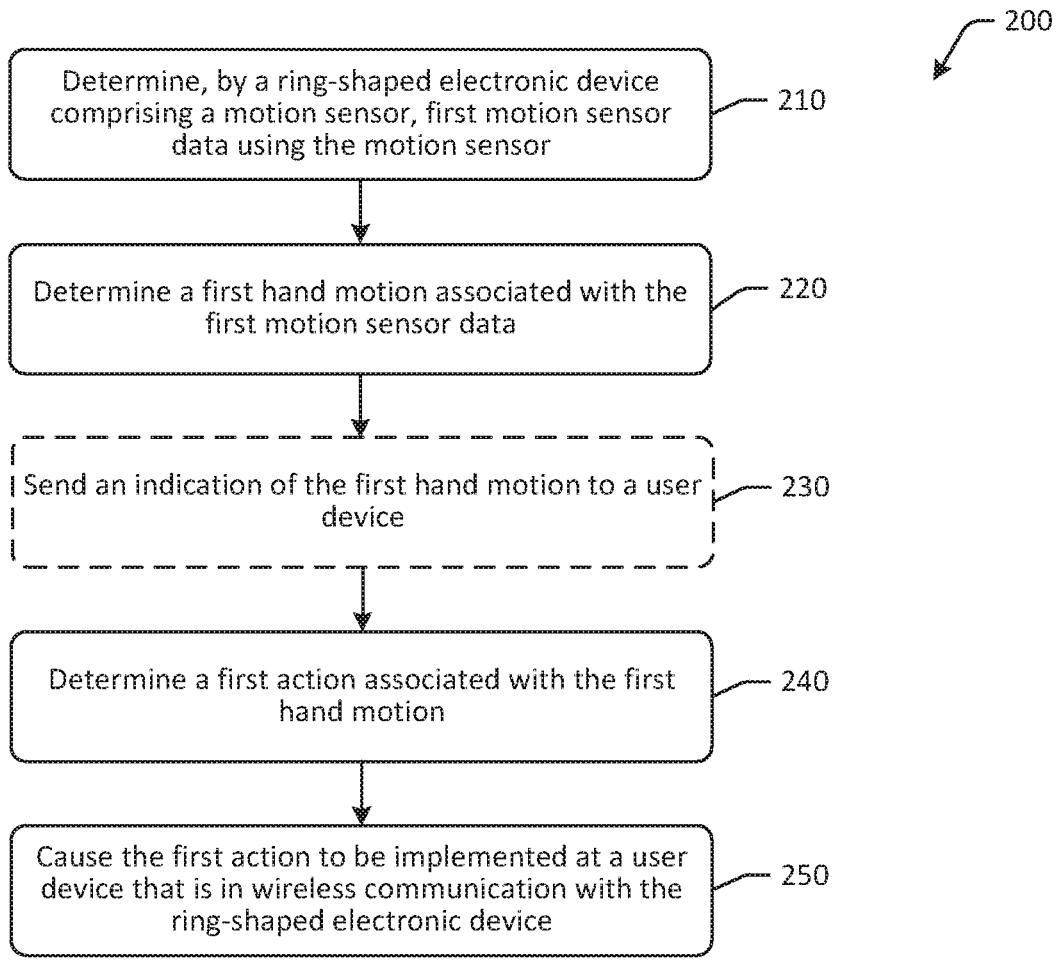
FIG. 2 is a schematic illustration of an example process flow for detecting hand gestures using ring-shaped electronic devices in accordance with one or more example embodiments of the disclosure.

FIG. 2 depicts an example process flow 200 for detecting hand gestures using ring-shaped electronic devices in accordance with one or more example embodiments of the disclosure. While example embodiments of the disclosure may be described in the context of ring-shaped electronic devices, it should be appreciated that the disclosure is more broadly applicable to various types of wearable devices that can be worn on hands or fingers. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a ring-shaped electronic device that includes a motion sensor, may be executed to determine first motion sensor data using the motion sensor. For example, one or more motion detection modules at a ring-shaped electronic device may determine first motion sensor data using the motion sensor. The ring-shaped electronic device may be worn on a finger of a hand of a user. The finger on which the ring-shaped electronic device is worn may be determined based at least in part on an input from the user. Motion sensor data may include accelerometer data representing changes in acceleration of the ring-shaped electronic device. Motion sensor data may include data output by gyroscopes, accelerometers, and/or other components, which may be used in conjunction with, or individually, to detect hand motions performed by the user of the ring. For example, detected or determined motion sensor data may be compared to stored motion sensor profiles that are associated with certain hand motions or gestures. For example, first motion sensor data may correspond to a motion sensor profile that is associated with a hand motion of twisting open a bottle cap, second motion sensor data may correspond to a motion sensor profile that is associated with a hand motion of opening a bottle using the ring-shaped electronic device, and so forth. In some instances, a number of certain hand motions during a time interval may be determined.

At block 220 of the process flow 200, computer-executable instructions stored on a memory of a device, such as a ring-shaped electronic device, may be executed to determine a first hand motion associated with the first motion sensor data. For example, one or more motion detection modules at a ring-shaped electronic device may determine a first hand motion associated with the first motion sensor data. The first hand motion may be determined using motion sensor profiles that correspond to an actual motion performed by a user's hand, such as twisting a bottle cap, popping open a bottle, running, typing, opening a door handle, making gestures, and other motions. The ring-shaped electronic device may therefore determine whether any hand motions or events correspond to the motion sensor data, and if so, which hand motion corresponds to the detected motion sensor data. In some embodiments, hand motions associated with the first motion sensor data may be determined using a database or table, such as the hand motion/action data illustrated in FIG. 1.

At optional block 230 of the process flow 200, computer-executable instructions stored on a memory of a device, such as a ring-shaped electronic device, may be executed to send an indication of the first hand motion to a user device. For example, in embodiments where the ring-shaped electronic device detects motion-based events locally, one or more communication modules at the ring-shaped electronic device may be configured to send an indication of the first hand motion to a user device using a wireless connection. The ring-shaped electronic device may be wirelessly connected to a user device, such as a smartphone, tablet, content streaming device, voice assistant device, speaker device, and/or other user device via a wireless connection such as Bluetooth, WiFi, ZigBee, Near Field Communication, or another suitable wireless connection protocol. The ring-shaped electronic device may send an indication of the first hand motion to a connected user device. In some embodiments, the ring-shaped electronic device may send motion sensor data to the connected user device instead of, or in addition to, an indication of the first hand motion or detected event.

At block 240 of the process flow 200, computer-executable instructions stored on a memory of a device, such as a ring-shaped electronic device or a smartphone, may be executed to determine a first action associated with the first hand motion. For example, one or more motion detection modules at a ring-shaped electronic device or another user device may determine a first action associated with the first hand motion. In some embodiments, the ring-shaped electronic device may process motion sensor data and determine the occurrence of a certain motion or event, and may subsequently determine a first action associated with the first hand motion. In other embodiments, a connected user device may determine a first action associated with the first hand motion. For example, a smartphone may determine or receive an indication of the first hand motion, and may determine the corresponding first action using a hand motion library or other database. In some embodiments, the ring-shaped electronic device and/or smartphone may determine the first action associated with the first hand motion using a third party application. For example, various third party applications may have different actions associated with the same hand motion. For example, a swiping left hand motion may be associated with an action of rewinding content in a first third party application, while the same swiping left hand motion may be associated with an action of reducing volume in a second third part application. In some embodiments, to determine the first action associated with the first hand motion, the ring-shaped electronic device and/or smartphone may select the first action from a plurality of actions associated with the first hand motion. For example, if the user performs the same hand motion more than once or a certain number of times, the action associated with the hand motion and the number of occurrences may vary. To track a number of occurrences, the ring-shaped electronic device and/or user device may include one or more action tracking modules. In some embodiments, to determine the first action associated with the first hand motion, the ring-shaped electronic device and/or smartphone may determine that a first device is in wireless communication with the user device, and may determine that the first action based at least in part on the connectivity to and/or association with the first device. For example, if the ring-shaped electronic device and/or smartphone is connected to a smart TV or a streaming device, a swiping right gesture or hand motion may be associated with an action of scrolling through content, whereas if there was no connection, the hand motion may be associated with an action of increasing volume of music.

At block 250 of the process flow 200, computer-executable instructions stored on a memory of a device, such as a ring-shaped electronic device, may be executed to cause the first action to be implemented at a user device that is in wireless communication with the ring-shaped electronic device. For example, one or more action implementation modules at the ring-shaped electronic device and/or user device that is connected to the ring-shaped electronic device may be executed to cause the first action to be implemented at a user device that is in wireless communication with the ring-shaped electronic device. In some embodiments, the ring-shaped electronic device may send a signal or command to the user device that causes the user device to execute or initiate the first action, while in other embodiments, the user device may determine the first action using the motion sensor data and may initiate the first action.

The hand motions or hand motion identifiers and associated actions may be stored at the ring-shaped electronic device, at the user device, and/or at a different computer system. The hand motions and associated actions may be customizable by users and may be changed over time. The user device, such as a smartphone, may receive the hand motion identifier or motion sensor data and may determine an associated action.

Figure 3:
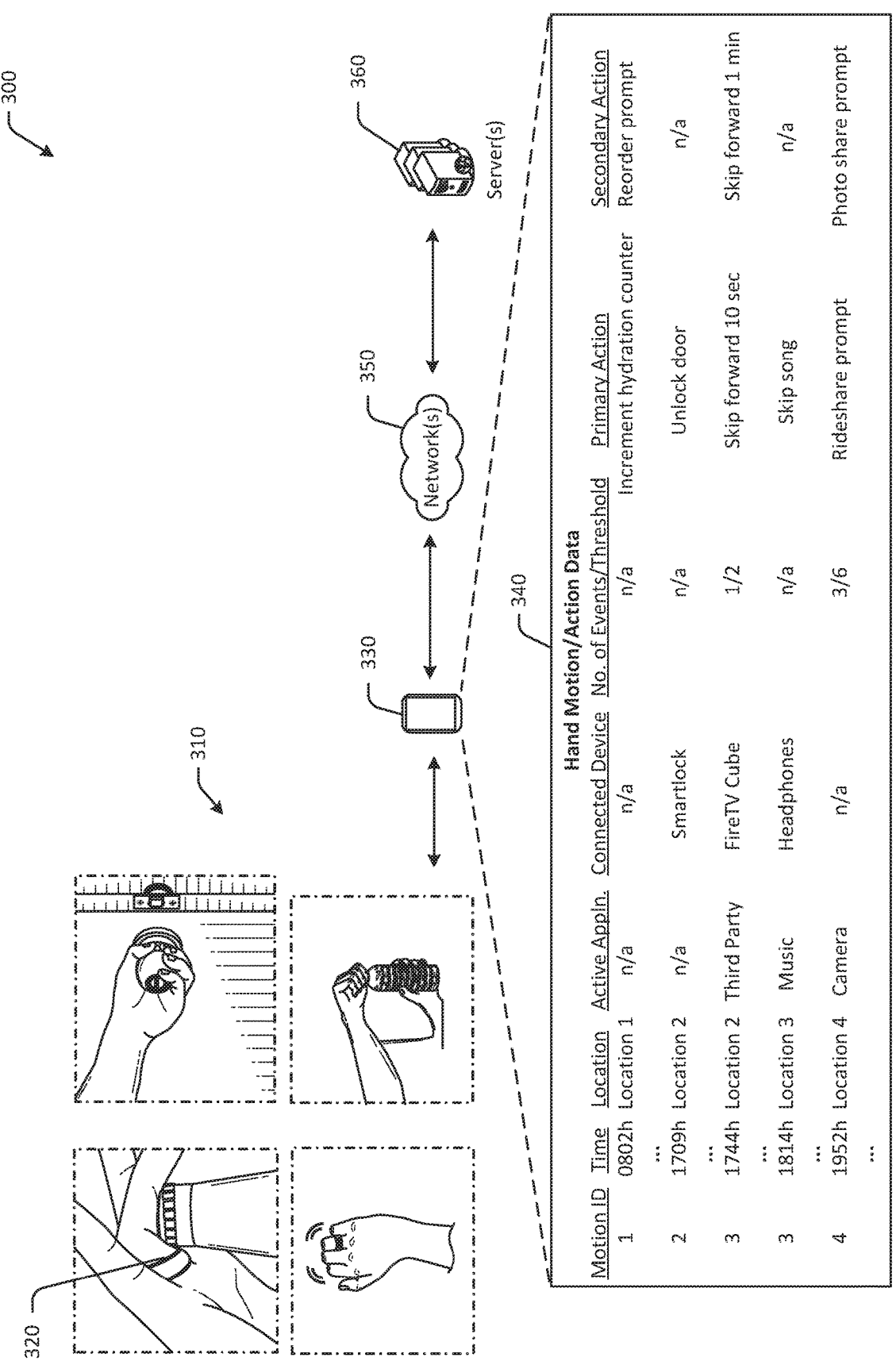
FIG. 3 is a schematic illustration of an example use case for detecting hand motions with ring-shaped electronic devices and determining associated actions in accordance with one or more example embodiments of the disclosure.

FIG. 3 is a schematic illustration of an example use case 300 for detecting hand motions with ring-shaped electronic devices and determining associated actions in accordance with one or more example embodiments of the disclosure. Different embodiments may include different, additional, or fewer entries than those illustrated in the example of FIG. 3.

In FIG. 3, various hand motions may be associated with various actions. In some instances, performing a certain hand motion a threshold number of times may cause different actions to be initiated. In addition, contextual signals may be used in some embodiments to select an action to be initiated from a set of available actions.

For example, at a first instance 310, a user may be wearing a ring-shaped electronic device 320. The ring-shaped electronic device 320 may be wirelessly connected to a smartphone 330. The smartphone 330 may be in the user's rear pocket, on a nearby table, or elsewhere, such as in the user's bag or in a different location in an ambient environment. At the first instance 310, the user may perform a hand motion while wearing the ring-shaped electronic device 320. For example, the user may open a bottle cap using the ring-shaped electronic device 320, the user may turn open a doorknob, the user may twist open a bottle cap, the user may knock on a door or other surface, and so forth.

The ring-shaped electronic device 320 may be configured to determine or detect one or more hand motions and to implement certain actions when a certain hand motion is detected. The ring-shaped electronic device 320 may determine motion sensor data representing a user gesture and may process the motion sensor data locally or send the motion sensor data to the smartphone 330 or other user device for processing.

The ring-shaped electronic device 320 and/or the smartphone 330 may determine a hand motion associated with the motion sensor data. For example, hand motions may be associated with unique motion sensor data patterns, and may be tracked using hand motion identifiers. In some embodiments, the ring-shaped electronic device 320 may send an indication of a detected hand motion to the smartphone 330. In other embodiments, the ring-shaped electronic device 320 may send motion sensor data to the smartphone 330, and the smartphone 330 may determine the hand motion associated with the motion sensor data.

The ring-shaped electronic device 320 and/or the smartphone 330 may determine an action associated with the detected hand motion using hand motion/action data 340. In some embodiments, the hand motion/action data 340 may be stored at the ring-shaped electronic device 320 in addition to, or instead of, at the smartphone 330.

The hand motion/action data 340 may include relationships between hand motions and corresponding actions. For example, a first hand motion may be associated with a primary action of incrementing a hydration counter, and a secondary action of a reorder prompt. Primary actions may be actions that are performed the first time a hand motion is detected within a time interval, and secondary actions may be actions that are performed when the primary action has been performed recently, or when a hand motion has been performed multiple times in the time interval, so as to avoid repetitive prompts, in one example.

As illustrated in the example of FIG. 3, the hand motion/action data 340 may include data records of recently performed hand motions, such as a time the action was detected, active applications at the time of detection, devices connected at the time of detection, the number of occurrences of the hand motion within a time interval, a threshold of occurrences after which an action is to be completed, primary actions, secondary actions, and so forth.

In the hand motion/action data 340, a second hand motion (e.g., twisting a doorknob, knocking on a surface, etc.) may be associated with an action of unlocking a door when a smart lock is connected, a third hand motion may be associated with an action of skipping forward in content ten seconds (or a minute if the hand motion is performed twice) when a third party application or a particular device is connected, a fourth hand motion may be associated with skipping a second when a certain application is active and/or headphones are connected, a fifth hand motion may be associated with generating a rideshare prompt and/or a photo share prompt when a certain application is active and/or a threshold number of occurrences is satisfied, and so forth. Hand motions may be uniquely detected due to the positioning of the ring-shaped electronic device on a user's finger, as opposed to on the user's wrist, where less granular motion sensor data may be collected. To initiate services, the smartphone 330 may communication with one or more servers 360 via one or more networks 350. As a result, initiating a rideshare order may be completed via communication with the server 360.

The hand motion/action data 340 may include data records that can be used to improve accuracy of actions associated with hand motions. For example, the location, time, active application, a force associated with the first motion sensor data, and/or connected device data may be used to determine a likely context for the user and to select accurate actions. For example, the smartphone 330 may select an action from a plurality of actions (e.g., primary action, secondary action, more than one action associated with a hand motion based on active application, etc.) based at least in part on connected devices and other contextual signals, such as those discussed with respect to FIG. 4.

Secondary actions may include actions that may be implemented at a delayed time. For example, in FIG. 3, the hand motion identifier 4 is associated with a primary action of rideshare prompt, and a secondary action of photo share prompt. The rideshare prompt may be initiated in real time, while the secondary action of opening a mobile application (e.g., photo sharing application, etc.) may be initiated the following day. In an example, the secondary action of a photo sharing prompt may be determined based at least in part on the determination that the user took photos during a particular time interval. For example, the smartphone 330 and/or the ring-shaped electronic device 320 may determine a first timestamp associated with a first hand motion, and a second timestamp associated with a second hand motion. The smartphone 330 and/or the ring-shaped electronic device 320 may determine that an image was captured within a predetermined length of time before the first timestamp or after the predetermined length of time after the second timestamp, and may therefore generate a recommendation to share the image using a mobile application.

In another example, the first hand motion may be associated with a twisting hand motion (e.g., twisting open a bottle cap, etc.). The smartphone 330 and/or the ring-shaped electronic device 320 may determine that the first hand motion has occurred a threshold number of times within a time interval. The smartphone 330 and/or the ring-shaped electronic device 320 may optionally determine second motion sensor data, where a second hand motion associated with the second motion sensor data is a drinking hand motion, and may therefore determine a hydration level associated with a user of the ring-shaped electronic device. The hydration level may be recorded by generating a hydration event record in a user health log. In some embodiments, a reorder notification for a beverage may be generated after a certain number of bottle opening events are detected.

Figure 4:
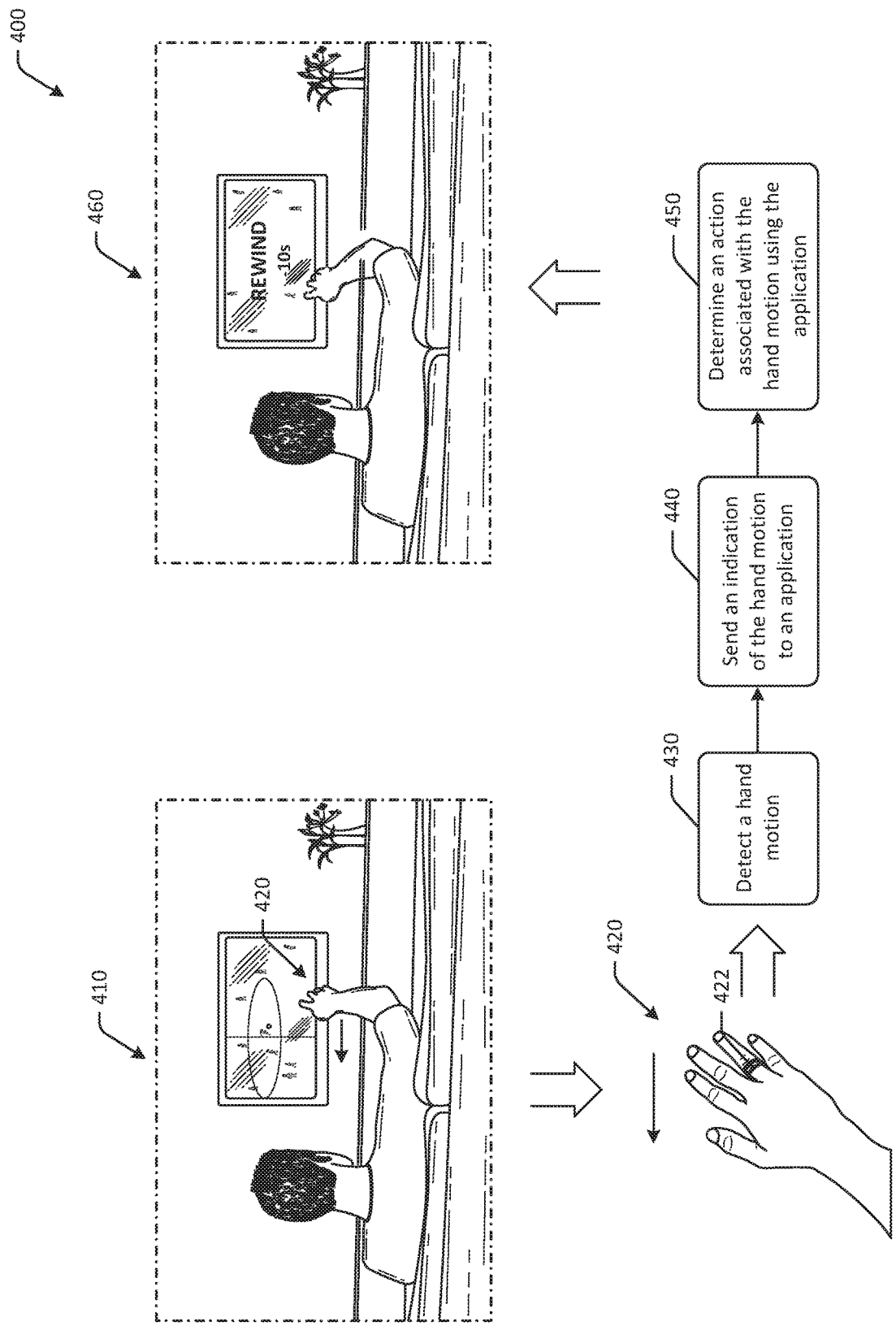
FIG. 4 is a schematic illustration of an example use case for using detected hand motions with a connected device in accordance with one or more example embodiments of the disclosure.

FIG. 4 is a schematic illustration of an example use case 400 for using detected hand motions with a connected device in accordance with one or more example embodiments of the disclosure. Although certain operations are illustrated in FIG. 4 as occurring at certain devices or in a certain order, in other embodiments, one or more operations may be performed by different computer systems and/or across a distributed computing environment. In addition, in other embodiments, data may be stored at different datastores and/or computer systems.

In some embodiments, hand motions performed by a user using ring-shaped electronic device may be detected by the ring-shaped electronic device and/or a user device. An indication of the detected hand motion may be sent to, or otherwise made available to, one or more third party or other applications. As a result, individual applications may have unique actions that are associated with the same hand motion. For example, a first application may have an action of rewinding associated with a particular hand motion, while a second hand motion may have an action of reducing volume of a device associated with the same hand motion.

In FIG. 4, at a first instance 410, user may perform a first hand motion 420 while wearing a ring-shaped electronic device 422. The first hand motion 420 may be, for example, a swiping left hand motion. The ring-shaped electronic device may determine the first hand motion 420 and may send an indication of the user interaction, such as a hand motion identifier, to a connected user device. The user device may receive the indication and may determine contextual data, such as which devices are connected to the user device, which applications are active at the user device or another connected device, which wireless network the device is connected to, a current time, a current location, and/or other contextual signals. Based at least in part on the contextual signals, the user device (or the ring-shaped electronic device 422) may determine or select a particular action that is associated with the first hand motion 420 and is to be initiated.

For example, at block 430 in the process flow illustrated in FIG. 4, the user device and/or the ring-shaped electronic device 422 may detect a hand motion, such as the swiping hand motion illustrated at the first instance 410. At block 440, the ring-shaped electronic device 422 may send an indication of the hand motion to the user device, and/or the user device may send an indication of the hand motion to a particular application. For example, a content streaming application may be active at the user device or at a connected device, such as a television. At block 450, the user device and/or the ring-shaped electronic device 422 may determine an action associated with the hand motion using the application. For example, the user may be consuming content at a television using a content streaming device. The user device may determine that the content streaming device is active (e.g., actively streaming content, etc.), and may therefore determine an action associated with the first hand motion 420 based at least in part on the content streaming device or a related application. For example, the action associated with the content streaming device or related application may be to rewind the content ten seconds. Accordingly, at a second instance 460, the content may be rewound ten seconds responsive to the first hand motion 420.

Accordingly, applications, including third party applications, and devices may implement unique actions based on hand motions performed using the ring-shaped electronic device 422. As a result, the same hand motions may be associated with more than one action that may be determined or selected based at least in part on context in which the hand motion is performed.

Figure 5:
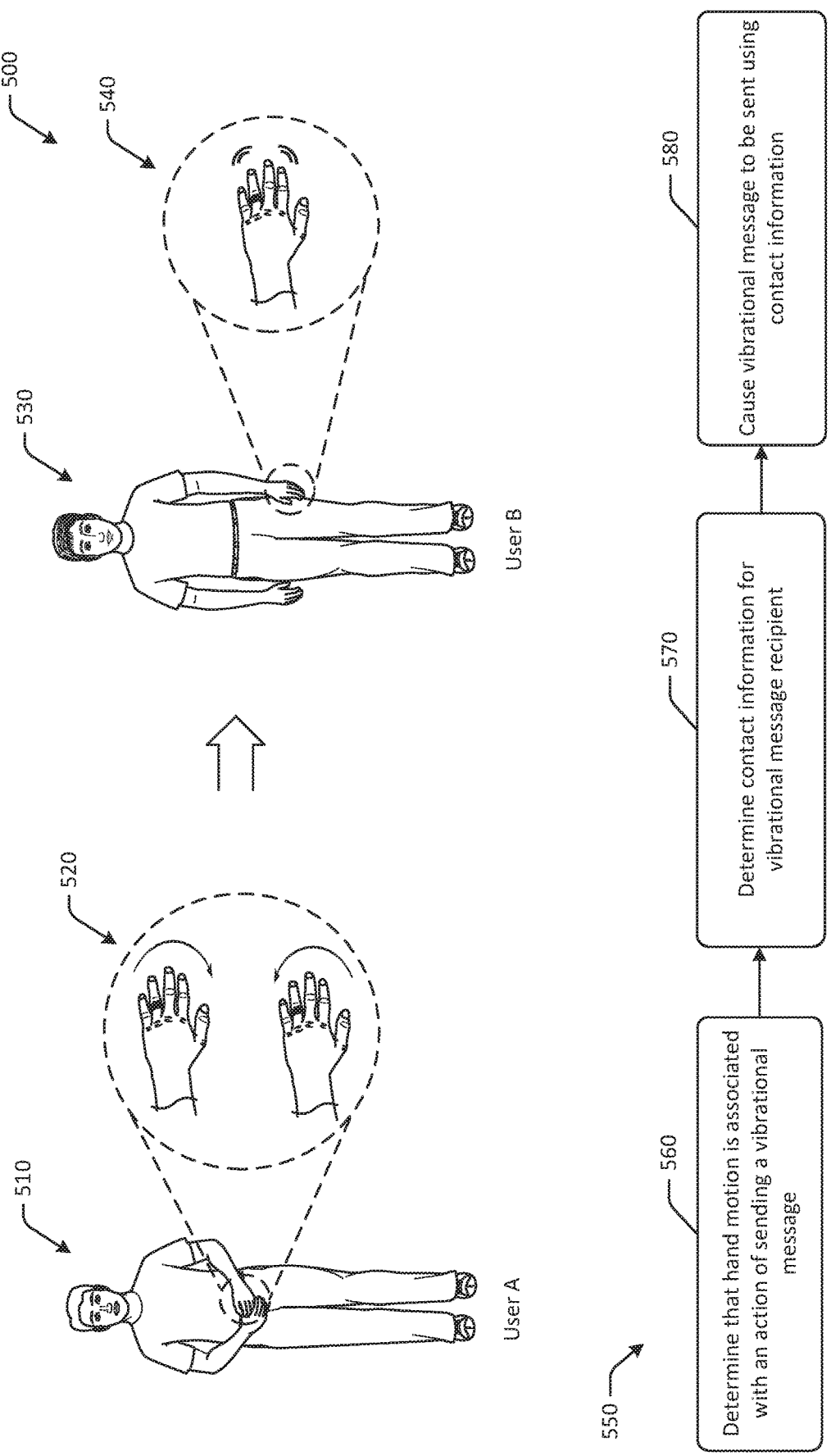
FIG. 5 is a schematic illustration of an example use case for using detected hand motions to generate vibrational messages in accordance with one or more example embodiments of the disclosure.

FIG. 5 is a schematic illustration of an example use case 500 for using detected hand motions to generate vibrational messages in accordance with one or more example embodiments of the disclosure. Although certain operations are illustrated in FIG. 5 as occurring at certain devices and/or in a certain order, in other embodiments, one or more operations may be performed by different computer systems and/or across a distributed computing environment. In addition, in other embodiments, data may be stored at different datastores and/or computer systems.

In FIG. 5, a first user 510 may perform a user interaction, such as a first hand motion 520 at a ring-shaped electronic device. The first hand motion 520 may be associated with an action of sending a vibrational message to another predesignated or preset user. A vibrational message may be a sequence of one or more vibrations that are presented at the recipient's ring-shaped electronic device or connected device. In this manner, vibrational messages, in some instances, may not have any particular meaning, but may be used as parts of games, to indicate that the user is thinking of the recipient, and so forth.

To initiate a vibrational message, in some embodiments, the first user 510 may perform a unique hand motion, such as a combination of gestures. In the example of FIG. 5, the first user may perform the first hand motion 520, which may include a waving motion, such as waving "hi." The ring-shaped electronic device and/or a connected user device may detect the first hand motion 520, and may cause a vibrational message to be sent to a second user 530. The second user 530 may have a ring-shaped electronic device 540 that vibrates when the vibrational message is received. The vibration may be a unique sequence of one or more vibrations and may alert the second user 530 that the first user 510 is thinking of them or has otherwise sent them a vibrational message.

To send vibrational messages, an example process flow 550 may be implemented. For example, at block 560, the ring-shaped electronic device or a connected user device may determine that a hand motion is associated with an action of sending a vibrational message. For example, the first user 510 may designate a custom hand motion that is associated with the action of sending a vibrational message. The first user 510 may designate a recipient to whom vibrational messages are to be sent. Accordingly, the ring-shaped electronic device may determine that an action of sending a vibrational message to a user account is associated with a detected hand motion.

At block 570, the ring-shaped electronic device and/or a connected user device may determine contact information for a vibrational message recipient. For example, the first user 510 may designate the second user 530 as a recipient of vibrational messages when the first hand motion 520 is detected. For example, one or more modules at the user device that is connected to the ring-shaped electronic device, or the ring-shaped electronic device itself in some embodiments, may determine contact information associated with the recipient. Contact information may be determined using a contact list, stored contact data at the user device or ring-shaped electronic device, remotely stored contact data, or other data storage. Contact information may include any suitable type of contact information, such as telephone numbers, email addresses, user account identifiers, device identifiers, and/or other types of contact information. Accordingly, a user account or other contact information associated with the second user 530 may be determined.

At a third block 580, the ring-shaped electronic device and/or a connected user device may cause a vibrational message to be sent using the contact information. As illustrated in FIG. 5, the second user 530 may receive vibrations at the second user's ring-shaped electronic device representing the vibrational message. In some embodiments, specific hand motions may be associated with specific recipients, such that a user can send multiple vibrational messages to different users by using different hand motions.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
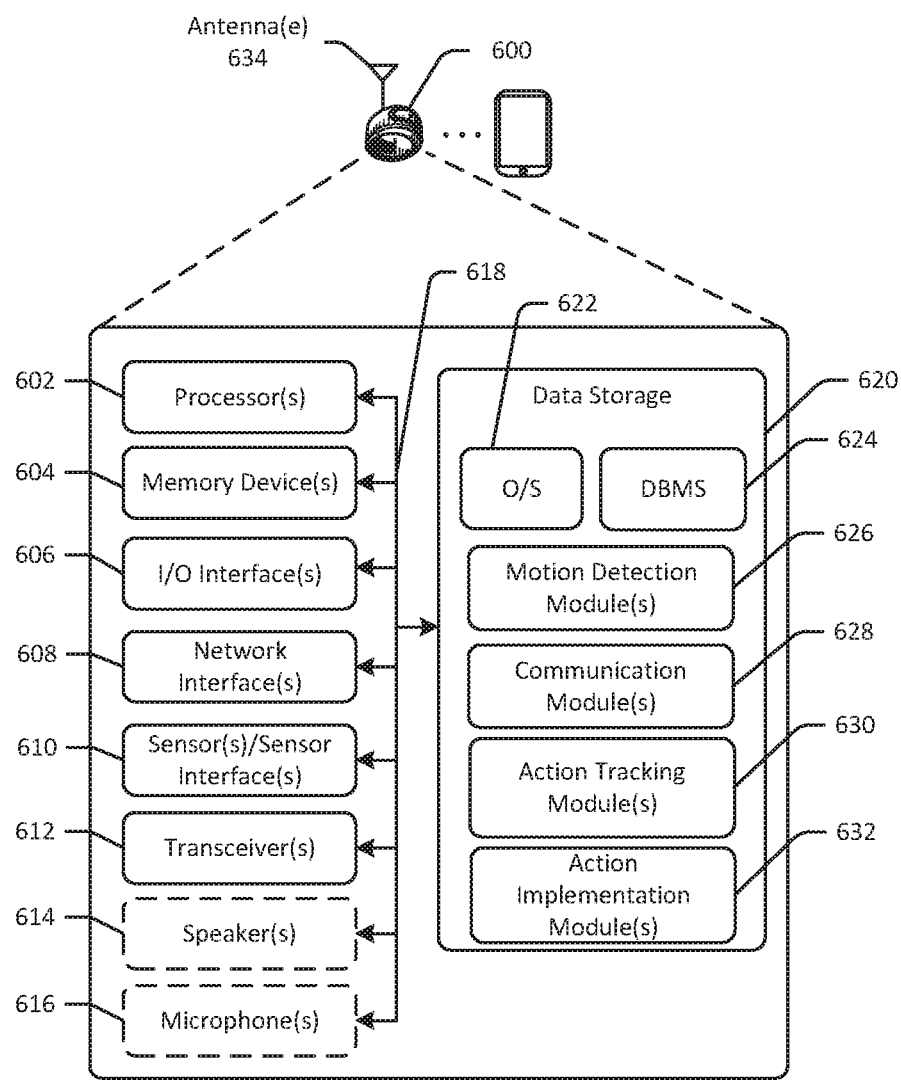
FIG. 6 is a schematic block diagram of an illustrative device in accordance with one or more example embodiments of the disclosure.

FIG. 6 is a schematic block diagram of an illustrative ring-shaped electronic device 600 in accordance with one or more example embodiments of the disclosure. The ring-shaped electronic device 600 may include any suitable computing device capable of receiving and/or sending data, and may optionally be coupled to devices including, but not limited to, a mobile device such as a smartphone, tablet, e-reader, wearable device, or the like; a desktop computer; a laptop computer; a content streaming device; a set-top box; or the like. The ring-shaped electronic device 600 may correspond to an illustrative device configuration for the devices of FIGS. 1-5.

The ring-shaped electronic device 600 may be configured to communicate via one or more networks with one or more servers, search engines, user devices, or the like. In some embodiments, a single remote server or single group of remote servers may be configured to perform more than one type of action initiation functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the ring-shaped electronic device 600 may include one or more processors (processor(s)) 602, one or more memory devices 604 (generically referred to herein as memory 604), one or more input/output (I/O) interface(s) 606, one or more network interface(s) 608, one or more sensors or sensor interface(s) 610, one or more transceivers 612, one or more optional speakers 614, one or more optional microphones 616, and data storage 620. The ring-shaped electronic device 600 may further include one or more buses 618 that functionally couple various components of the ring-shaped electronic device 600. The ring-shaped electronic device 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the ring-shaped electronic device 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the ring-shaped electronic device 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more motion detection module(s) 626, one or more communication module(s) 628, one or more action tracking module(s) 630, and/or one or more action implementation module(s) 632. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the ring-shaped electronic device 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, user action information, user contact data, device pairing information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the ring-shaped electronic device 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the motion detection module(s) 626 may include computer-executable instructions, code, or the like that responsive to execution by one or more of the processor(s) 602 may perform functions including, but not limited to, determining accelerometer data, collecting motion sensor data, determining or detecting events, determining contextual data, determining a number of events that have occurred during a time interval, and the like.

The communication module(s) 628 may include computer-executable instructions, code, or the like that responsive to execution by one or more of the processor(s) 602 may perform functions including, but not limited to, communicating with one or more devices, for example, via wired or wireless communication, communicating with user devices, communicating with remote servers, communicating with remote datastores, sending or receiving notifications or commands/directives, communicating with cache memory data, communicating with user devices, and the like.

The action tracking module(s) 630 may include computer-executable instructions, code, or the like that responsive to execution by one or more of the processor(s) 602 may perform functions including, but not limited to, analyzing motion data, determining occurrence of gesture motions, determining patterns of gestures, determining actions associated with gestures or hand motions, and the like.

The action implementation module(s) 632 may include computer-executable instructions, code, or the like that responsive to execution by one or more of the processor(s) 602 may perform functions including, but not limited to, determining user selected action preferences, determining actions associated with user interactions, determining actions associated with gestures, determining user devices associated with a user account, sending signals to user devices, initiating commands locally or at remote devices, and the like.

Referring now to other illustrative components depicted as being stored in the data storage 620, the O/S 622 may be loaded from the data storage 620 into the memory 604 and may provide an interface between other application software executing on the ring-shaped electronic device 600 and hardware resources of the ring-shaped electronic device 600. More specifically, the O/S 622 may include a set of computer-executable instructions for managing hardware resources of the ring-shaped electronic device 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the ring-shaped electronic device 600 is a mobile device, the DBMS 624 may be any suitable light-weight DBMS optimized for performance on a mobile device.

Referring now to other illustrative components of the ring-shaped electronic device 600, the input/output (I/O) interface(s) 606 may facilitate the receipt of input information by the ring-shaped electronic device 600 from one or more I/O devices as well as the output of information from the ring-shaped electronic device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the ring-shaped electronic device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The ring-shaped electronic device 600 may further include one or more network interface(s) 608 via which the ring-shaped electronic device 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna(e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum.

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the ring-shaped electronic device 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the ring-shaped electronic device 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors (e.g., motion sensor(s)), force sensors, thermal sensors, and so forth. Example types of inertial sensors may include accelerometers (e.g., MEMS-based accelerometers), gyroscopes, and so forth.

The optional speaker(s) 614 may be any device configured to generate audible sound. The optional microphone(s) 616 may be any device configured to receive analog sound input or voice data, and may include noise cancellation functionality.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the ring-shaped electronic device 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the ring-shaped electronic device 600 may include alternate and/or additional hardware, software, or firmware components beyond those described or depicted without departing from the scope of the disclosure. More particularly, it should be appreciated that software, firmware, or hardware components depicted as forming part of the ring-shaped electronic device 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    determining, by a ring-shaped electronic device comprising one or more computer processors coupled to memory, first accelerometer data using an accelerometer of the ring-shaped electronic device, wherein the ring-shaped electronic device is worn on a finger of a user;
    sending the first accelerometer data to a user device that is in wireless communication with the ring-shaped electronic device;
    determining, using a hand motion library, that the first accelerometer data represents a hand motion of opening a bottle;
    determining second accelerometer data using the accelerometer;
    determining, using the hand motion library, that the second accelerometer data represents the hand motion of opening a bottle;
    determining that a number of bottles opened by the user within a time interval is greater than or equal to a first predetermined number;
    determining a current time;
    determining a current location of the ring-shaped electronic device;

determining that a first action associated with the hand motion, the number of bottles opened by the user, the current time, and the current location is a beverage reorder prompt;
generating the beverage reorder prompt;
determining an affirmative response to the beverage reorder prompt; and
causing the user device to initiate the beverage reorder.

2. The method of claim 1, further comprising:
determining third accelerometer data using the accelerometer;
determining, using the hand motion library, that the third accelerometer data represents a hand motion of swiping left;
determining that a content streaming device is in wireless communication with the user device;
determining that a second action associated with the hand motion of swiping left is to send a rewind command to the content streaming device; and
causing the user device to send the rewind command.

3. The method of claim 1, further comprising:
determining third accelerometer data using the accelerometer;
determining, using the hand motion library, that the third accelerometer data represents a custom hand motion;
determining, using the hand motion library, that a second action associated with the custom hand motion is sending a vibrational message to a user account;
determining contact information associated with the user account; and
sending the vibrational message to the user account.

4. The method of claim 1, further comprising:
determining a first timestamp associated with the first accelerometer data;
determining a second timestamp associated with the second accelerometer data;
determining that an image was captured within a predetermined length of time before the first timestamp or after the predetermined length of time after the second timestamp; and
generating a recommendation to share the image using a mobile application.

5. A method comprising:
determining, by a ring-shaped electronic device comprising a motion sensor, first motion sensor data using the motion sensor;
determining a first hand motion associated with the first motion sensor data;
selecting a first action for execution by a user device, wherein the first action is associated with the first hand motion, and wherein the first action is selected from a set of actions that are associated with the first hand motion, the set of actions comprising the first action and a second action that is different than the first action; and
causing the first action to be executed by the user device, wherein the user device is in wireless communication with the ring-shaped electronic device;
determining that the first hand motion has occurred a threshold number of times within a time interval; and
generating a reorder notification.

6. The method of claim 5, wherein the ring-shaped electronic device is configured to be worn on a finger of a hand.

7. The method of claim 5, further comprising:
sending an indication of the first hand motion to the user device.

8. The method of claim 5, wherein selecting the first action further comprises selecting the first action associated with the first hand motion using a third party application.

9. The method of claim 5, further comprising:
determining that a first device is in wireless communication with the user device; and
determining that the first action is associated with the first device.

10. The method of claim 5, further comprising:
determining at least one of: a time, a location, or a force associated with the first motion sensor data;
wherein determining the first action associated with the first hand motion comprises determining the first action associated with the first hand motion using at least one of the time, the location, or the force.

11. The method of claim 5, further comprising:
generating a recommendation to open a mobile application based at least in part on the first hand motion.

12. The method of claim 5, wherein selecting the first action comprises selecting an action of sending a vibrational message to a user account is associated with the hand motion, the method further comprising:
determining contact information associated with the user account.

13. The method of claim 5, wherein the first hand motion is a twisting hand motion, the method further comprising:
determining second motion sensor data;
determining that a second hand motion associated with the second motion sensor data is a drinking hand motion; and
determining a hydration level associated with a user of the ring-shaped electronic device;
wherein the first action is generating a hydration event record in a user health log.

14. The method of claim 5, wherein the reorder notification is for a beverage.

15. A ring-shaped electronic device comprising:
a button;
a speaker;
a microphone;
a motion sensor;
memory configured to store computer-executable instructions; and
at least one computer processor configured to access the memory and execute the computer-executable instructions to:
determine first motion sensor data using the motion sensor;
determine a first hand motion associated with the first motion sensor data;
select a first action for execution by a user device, wherein the first action is associated with the first hand motion, and wherein the first action is selected from a set of actions that are associated with the first hand motion, the set of actions comprising the first action and a second action that is different than the first action; and
cause the first action to be executed by the user device, wherein the user device is in wireless communication with the ring-shaped electronic device;
determine that the first hand motion has occurred a threshold number of times within a time interval; and
generate a reorder notification.

16. The system of claim 15, wherein the at least one processor is further configured to access the memory and execute the computer-executable instructions to:

send an indication of the first hand motion to a user device.

17. The system of claim 15, wherein the at least one processor is further configured to execute the computer-executable instructions to:
 determine that a first device is in wireless communication with the user device; and
 determine that the first action is associated with the first device.

\* \* \* \* \*